US009939158B2

(12) United States Patent
Taniguchi et al.

(10) Patent No.: US 9,939,158 B2
(45) Date of Patent: Apr. 10, 2018

(54) COMBUSTOR WITH RING PART HAVING PROTRUSIONS AND GAS TURBINE INCLUDING THE COMBUSTOR

(71) Applicant: MITSUBISHI HITACHI POWER SYSTEMS, LTD., Kanagawa (JP)

(72) Inventors: Kenta Taniguchi, Tokyo (JP); Norihiko Motoyama, Tokyo (JP); Yoshiro Nakamura, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 250 days.

(21) Appl. No.: 14/770,638

(22) PCT Filed: Feb. 18, 2014

(86) PCT No.: PCT/JP2014/053771
§ 371 (c)(1),
(2) Date: Aug. 26, 2015

(87) PCT Pub. No.: WO2014/141825
PCT Pub. Date: Sep. 18, 2014

(65) Prior Publication Data
US 2016/0003481 A1 Jan. 7, 2016

(30) Foreign Application Priority Data

Mar. 15, 2013 (JP) .................................. 2013-053149

(51) Int. Cl.
*F23R 3/42* (2006.01)
*F01D 9/02* (2006.01)
(Continued)

(52) U.S. Cl.
CPC ............... *F23R 3/42* (2013.01); *F01D 9/023* (2013.01); *F02C 3/04* (2013.01); *F23R 3/46* (2013.01);
(Continued)

(58) Field of Classification Search
CPC ...... F23R 3/42; F23R 3/46; F23R 3/54; F23R 2900/00012; F01D 9/023; F02C 3/04
See application file for complete search history.

(56) References Cited

U.S. PATENT DOCUMENTS 3,359,724 A    12/1967  Barnwell et al.
3,956,886 A  *  5/1976  Sedgwick ............... F23R 3/007
                                                    60/753
(Continued)

FOREIGN PATENT DOCUMENTS

CN    1463345      12/2003
JP    56-108026     8/1981
(Continued)

OTHER PUBLICATIONS

Extended European Search Report dated Mar. 22, 2016 in corresponding European Patent Application No. 14762567.7.
(Continued)

*Primary Examiner* — Steven Sutherland
(74) *Attorney, Agent, or Firm* — Wenderoth, Lind & Ponack, L.L.P.

(57) ABSTRACT

A combustor includes a first tube which supplies fuel and air from an opening formed in a distal end thereof, and a second tube which is configured such that flames are formed on an inner circumferential side thereof by the fuel and the air and the distal end of the first tube is inserted into an inner circumferential side of a proximal end thereof. The first tube includes a first tube main body and a ring part forming the distal end of the first tube. The ring part has a main body of a tubular shape and a plurality of protrusions that are integrally formed with the main body on an outer circumferential surface of the main body and protrude radially outward. When viewed in an axial direction, the outer circumferential surface of the main body has a polygonal (Continued)

cross-sectional shape within a range within which the protrusions are formed.

6 Claims, 8 Drawing Sheets

(51) Int. Cl.
F02C 3/04 (2006.01)
F23R 3/46 (2006.01)
F23R 3/54 (2006.01)

(52) U.S. Cl.
CPC ...... *F23R 3/54* (2013.01); *F23R 2900/00012* (2013.01)

(56) References Cited

U.S. PATENT DOCUMENTS

| | | | |
|---|---|---|---|
| 6,732,528 B2 | 5/2004 | Akagi et al. | |
| 2003/0000216 A1 | 1/2003 | Akagi et al. | |
| 2003/0010038 A1* | 1/2003 | Maghon | F23M 5/08 60/796 |
| 2004/0074236 A1 | 4/2004 | Mandai et al. | |
| 2010/0186415 A1 | 7/2010 | Brown et al. | |
| 2012/0180500 A1 | 7/2012 | DiCintio | |

FOREIGN PATENT DOCUMENTS

| | | |
|---|---|---|
| JP | 10-238777 | 9/1998 |
| JP | 2003-13747 | 1/2003 |
| JP | 2003-14236 | 1/2003 |
| JP | 2005-171894 | 6/2005 |

OTHER PUBLICATIONS

Office Action dated Mar. 24, 2016 in corresponding Chinese Application No. 201480010620.1 (with English translation).

Second Office Action dated Nov. 15, 2016 in corresponding Chinese Application No. 201480010620.1 (with English translation).

International Search Report dated Mar. 18, 2014 in corresponding International Application No. PCT/JP2014/053771, with English translation.

Written Opinion of the International Searching Authority dated Mar. 18, 2014 in corresponding International Application No. PCT/JP2014/053771, with English translation.

* cited by examiner

COMBUSTOR WITH RING PART HAVING PROTRUSIONS AND GAS TURBINE INCLUDING THE COMBUSTOR

CROSS-REFERENCE TO RELATED APPLICATION

Priority is claimed from Japanese Patent Application No. 2013-053149, filed on Mar. 15, 2013, the content of which is incorporated herein by reference.

TECHNICAL FIELD

The present invention relates to a combustor that burns fuel in compressed air to produce a combustion gas and a gas turbine having the same.

BACKGROUND ART

A gas turbine is equipped with a compressor that produces compressed air, a combustor that burns fuel in the compressed air to produce a combustion gas, and a turbine that is rotatably driven by the combustion gas. The combustor has a combustor basket that supplies a fuel and air, and a transition piece in which flames are formed by the fuel and air supplied from the combustor basket and which produces the combustion gas (see, e.g., Japanese Unexamined Patent Application, First Publication No. 2003-13747).

Conventionally, a structure for supplying film air from a gap between a transition piece and an outlet outer ring constituting a distal end of a combustor basket in order to prevent an inner wall surface of the transition piece from being damaged by a combustion gas produced in the transition piece is known. In this structure, spacers are attached to the outlet outer ring to secure the gap for supplying the film air.

The plurality of spacers are attached to an outer circumferential surface of the outlet outer ring in a circumferential direction. As the spacers are in contact with an inner circumferential surface of the transition piece, the gap for supplying the film air is uniformly secured throughout the circumference.

Technical Problem

However, attaching the spacers to the outlet outer ring as in the structure described in Japanese Unexamined Patent Application, First Publication No. 2003-13747 causes a problem in that the number of components increases and manufacturing costs of the combustor increase.

An object of the present invention is to provide a combustor capable of reducing manufacturing costs by reducing the number of components, and a gas turbine having the same.

Solution to Problem

According to a first aspect of the present invention, a combustor includes: a first tube which supplies fuel and air from an opening formed in a distal end thereof; and a second tube which is configured such that flames are formed on an inner circumferential side thereof by the fuel and the air and the distal end of the first tube is inserted into an inner circumferential side of a proximal end thereof. The first tube includes a first tube main body and a ring part forming the distal end of the first tube. The ring part has a main body of a tubular shape and a plurality of protrusions that are integrally formed with the main body on an outer circumferential surface of the main body and protrude radially outward. When viewed in an axial direction along an axis of the first tube, the outer circumferential surface of the main body has a polygonal cross-sectional shape within a range within which the protrusions are formed.

According to the above constitution, the main body and the protrusions are integrally formed at the ring part. Thereby, the number of components can be reduced, and manufacturing costs of the combustor can be reduced. Also, when the outer circumferential surface of the main body being a workpiece is formed, the number of times the relative angle between the working tool and the workpiece is changed is reduced, and thus the machining man-hours can be reduced.

In the combustor, the main body may include a polygonal ring part on which the protrusions are formed, and a restrictor part which is provided at a distal end side relative to the polygonal ring part and an outer circumferential surface of which is formed in a cylindrical shape at a radially outer circumferential side relative to an outer circumferential surface of the polygonal ring part.

According to the above constitution, since the restrictor part is formed in the cylindrical shape, a second gap between the outer circumferential surface of the restrictor part and the inner circumferential surface of the second tube is uniform. Thereby, air ejected from this gap can be uniformized in a circumferential direction.

In the combustor, the protrusions may be formed in centers of outer circumferential planes of the polygonal ring part in a circumferential direction.

According to the above constitution, the protrusions are formed using a working tool for forming the outer circumferential planes. Thereby, it is possible to form the high-precision protrusions in which a radial thickness is uniform and a circumferential surface is wide in the radial direction.

In the combustor, when viewed in a radial direction along a radius of the first tube, the protrusions may have a spindle cross-sectional shape along the axial direction.

According to the above constitution, disturbance of a fluid at positions at which the protrusions are disposed is effectively suppressed. Thereby, uniformity of the air ejected from the second gap can be improved.

Also, the present invention provides a gas turbine that includes: any of the above combustors; and a turbine driven by a combustion gas delivered from the second tube of the combustor.

Since the gas turbine is equipped with the combustor, the number of components can be reduced, and the manufacturing costs of the combustor can be reduced.

Advantageous Effects of Invention

According to the present invention, the main body and the protrusions are integrally formed at the ring part. Thereby, the number of components can be reduced, and manufacturing costs of the combustor can be reduced. Also, when the outer circumferential surface of the main body being a workpiece is formed, the number of times the relative angle between the working tool and the workpiece is changed is reduced, and thus the machining man-hours can be reduced.

DESCRIPTION OF EMBODIMENTS

Hereinafter, an embodiment of the present invention will be described in detail with reference to the drawings.

Figure 1:
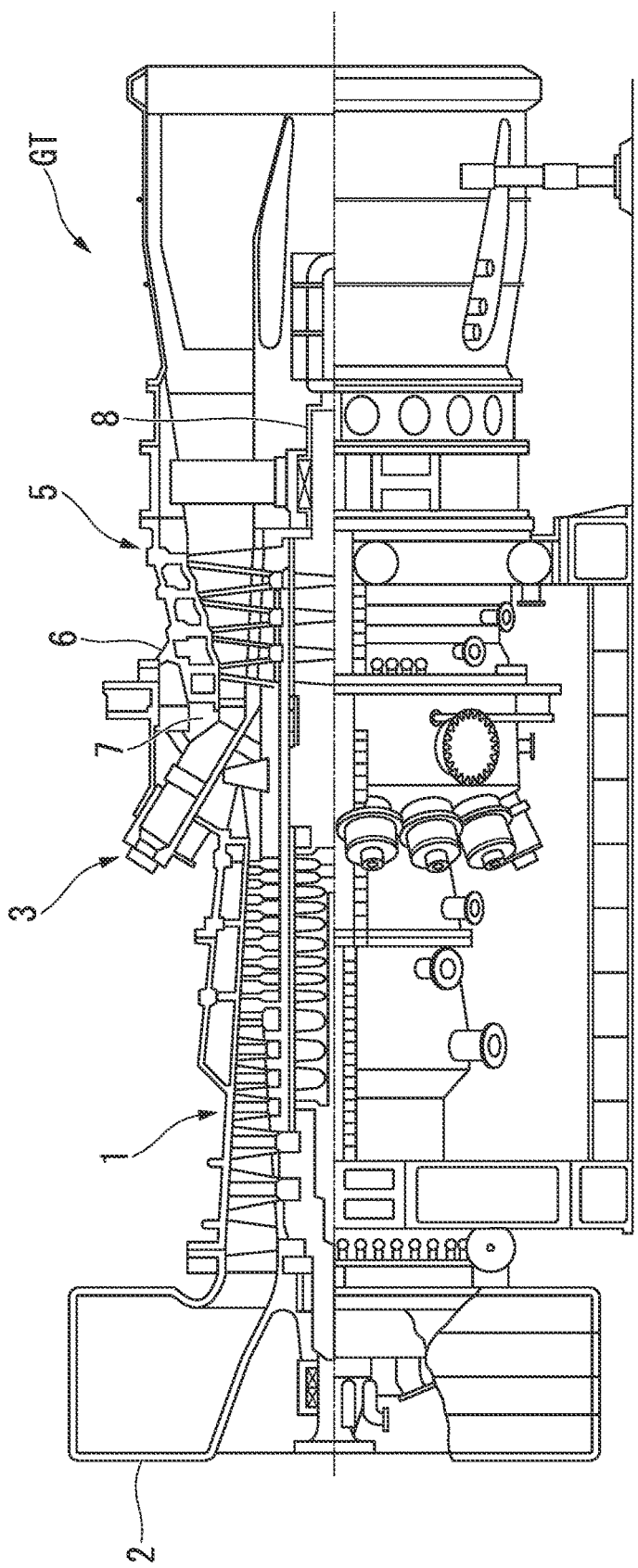
FIG. 1 is a cutaway side view illustrating essential parts of a gas turbine in an embodiment of the present invention.

As illustrated in FIG. 1, a gas turbine GT of the present embodiment is equipped with a compressor 1 that produces compressed air, a combustor 3 that burns fuel in the compressed air to produce a combustion gas, and a turbine 5 that is rotatably driven by the combustion gas. The turbine 5 has a turbine casing 6 in which a casing 7 is formed, and a turbine rotor 8 that is rotatably installed in the casing 7.

The compressor 1 takes in open air from its air intake 2 and compresses the open air, thereby producing the compressed air. The combustor 3 mixes fuel with the compressed air from the compressor 1 and burns the fuel. A high-temperature high-pressure combustion gas produced by the combustion of the fuel rotatably drives the turbine rotor 8.

Figure 2:
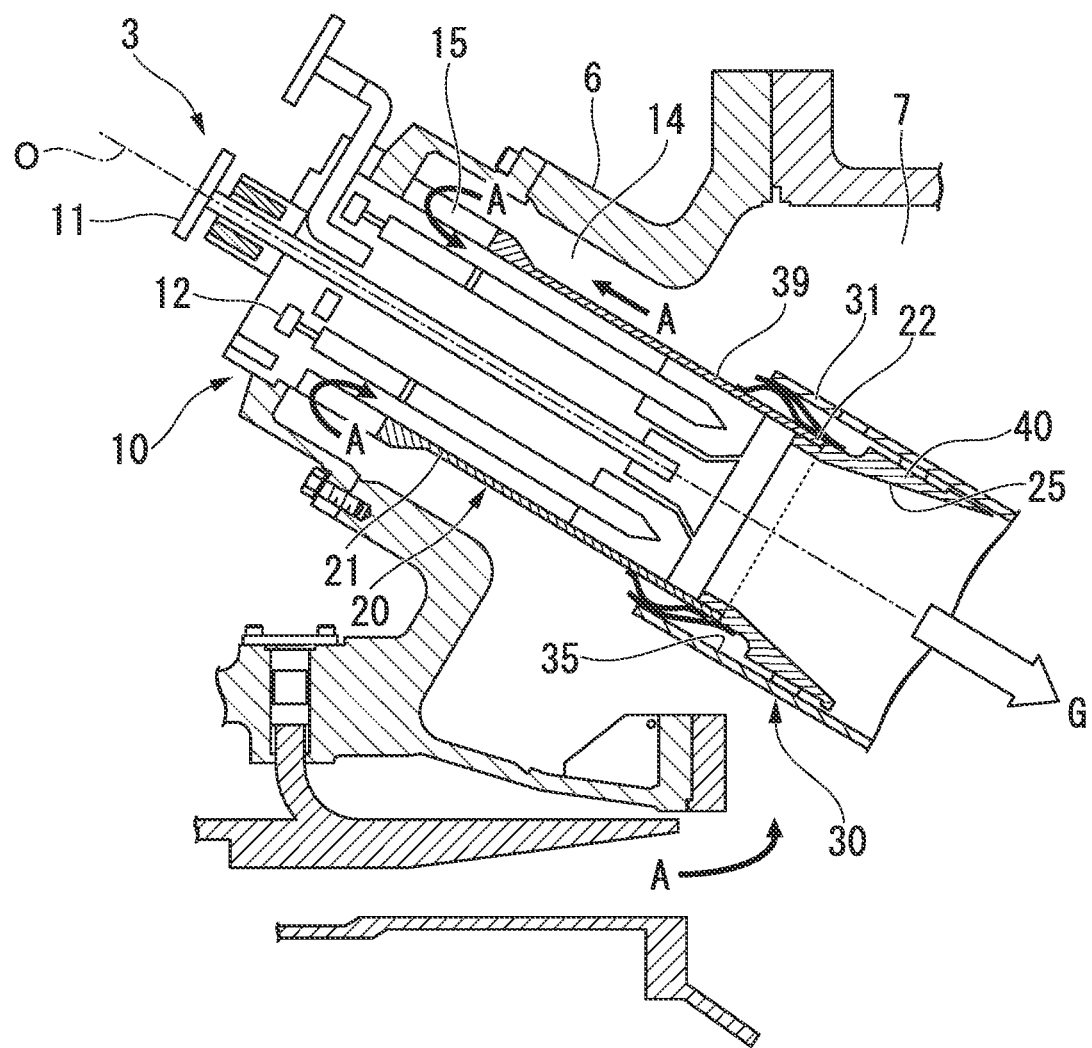
FIG. 2 is a cross-sectional view around a combustor of the gas turbine in the embodiment of the present invention.

As illustrated in FIG. 2, the combustor 3 has a fuel supplier 10 that injects the compressed air A from the compressor 1 (see FIG. 1) and the fuel, a combustor basket (first tube) 20 that supplies the compressed air A and the fuel from the fuel supplier 10, a transition piece (second tube) 30 that produces a combustion gas G from the compressed air A and the fuel supplied from the combustor basket 20 and sends the produced combustion gas G to the turbine 5. Both the combustor basket 20 and the transition piece 30 of the combustor 3 are disposed inside the casing 7 of the turbine 5.

The fuel supplier 10 is equipped with a pilot burner 11 that supplies the compressed air A from the compressor 1 and a pilot fuel, and a plurality of nozzles 12 that premixes the compressed air A from the compressor 1 and a main fuel into a premixed gas.

The combustor basket 20 has a combustor basket main body 39 that has a cylindrical shape and is disposed at a side of the combustor basket 20 in a first direction, and an outlet outer ring 40 that has an annular shape and is disposed at a side of the combustor basket 20 in a second direction opposite to the first direction. The fuel supplier 10 is installed at an end of the combustor basket 20 in the first direction, and an opening 25 is formed in an end of the combustor basket 20 in the second direction. The outlet outer ring 40 forms a distal end of the combustor basket 20.

In the following description, an end of the combustor basket main body 39 in the first direction is defined as a proximal end 21, and an end of the combustor basket main body 39 in the second direction is defined as a distal end 22. A side of the proximal end 21 that is the end in the first direction is defined as an upstream side, and a side of the distal end 22 that is the end in the second direction is defined as a downstream side. A direction along an axis O of the combustor basket 20 will be described as an axial direction, a direction along a circumference centered at the axis O will be described as a circumferential direction, and a direction along a radius of the circumference will be described as a radial direction.

The outlet outer ring 40 is attached to the distal end 22 of the combustor basket main body 39. The outlet outer ring 40 has a shape that causes the combustor basket main body 39 to extend and increase in diameter toward the downstream side.

The transition piece 30 has a tubular shape, and an opening 35 is formed in an end thereof in the first direction. An inner diameter of the opening 35 is greater than an outer diameter of the distal end 22 of the combustor basket 20 and an outer diameter of the outlet outer ring 40. In the following description, an upstream end of the transition piece 30 is defined as a proximal end 31. The distal end 22 of the combustor basket main body 39 and the outlet outer ring 40 are inserted into the proximal end 31 of the transition piece 30. A downstream end of the transition piece 30 is connected to a combustion passage of the turbine 5 (see FIG. 1).

The fuel supplier 10 is fixed to the turbine casing 6. The proximal end 21 of the combustor basket 20 is supported on the fuel supplier 10 that is fixed to the turbine casing 6. The distal end 22 of the combustor basket main body 39 is supported together with the proximal end 31 of the transition piece 30 by a support member (not shown) installed on the turbine casing 6.

The pilot burner 11 of the fuel supplier 10 and the plurality of nozzles 12 are disposed inside the combustor basket 20. Each combustor 3 is coupled with neighboring combustors 3 via couplers (not shown). Flames of the combustor 3 are propagated to the neighboring combustors 3 via the couplers.

Figure 3:
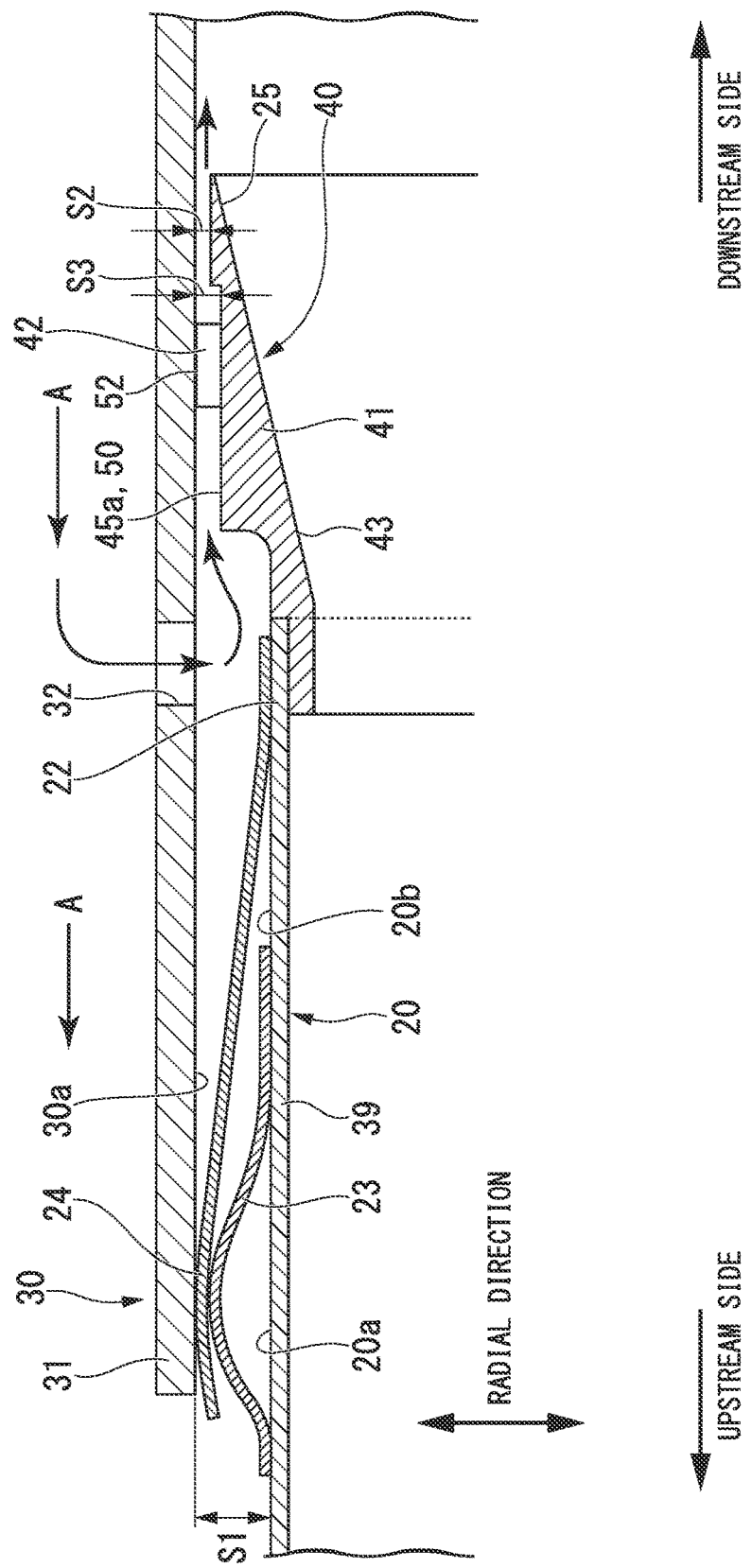
FIG. 3 is a cross-sectional view illustrating essential parts of the combustor in the embodiment of the present invention, and a connecting portion between a combustor basket and a transition piece

As illustrated in FIG. 3, at a connecting portion (fitting region) between the combustor basket 20 and the transition piece 30, there is a gap S1 between an outer circumferential surface 20b of the combustor basket main body 39 and an inner circumferential surface 30a of the transition piece 30. The gap S1 allows expansion and displacement due to heat of the combustor basket 20 and the transition piece 30. To seal the gap S1, a leaf spring 23 and a seal plate 24 supported by the leaf spring 23 are attached to the outer circumferential surface 20b adjacent to the distal end 22 of the combustor basket main body 39.

The seal plate 24 is a cylindrical thin plate for sealing the connecting portion between the combustor basket 20 and the transition piece 30. The seal plate 24 is formed with a plurality of slits (not shown) at intervals in the circumferential direction. An outer circumferential surface of the upstream side of the seal plate 24 is in contact with the inner circumferential surface 30a of the transition piece 30, and an inner circumferential surface of the downstream side of the seal plate 24 is joined to the outer circumferential surface 20b of the combustor basket main body 39.

The leaf spring 23 is an elastic member that biases the upstream side of the seal plate 24 from a radially inner circumferential side toward the inner circumferential surface 30a of the transition piece 30. The leaf spring 23 has a cylindrical shape similarly to the seal plate 24.

The outlet outer ring 40 connected to the distal end 22 of the combustor basket main body 39 has a main body 41 of a tubular shape and a plurality of protrusions 42 that are provided in an outer circumferential surface of the main body 41 in the circumferential direction and protrude to a radially outer side. An extension surface 43 that has a tapered shape and is gradually increased in diameter toward the downstream side is formed at an inner circumferential side of the main body 41. The compressed air A and the fuel are smoothly supplied from the combustor basket 20 to the transition piece 30 by the extension surface 43.

Figure 4:
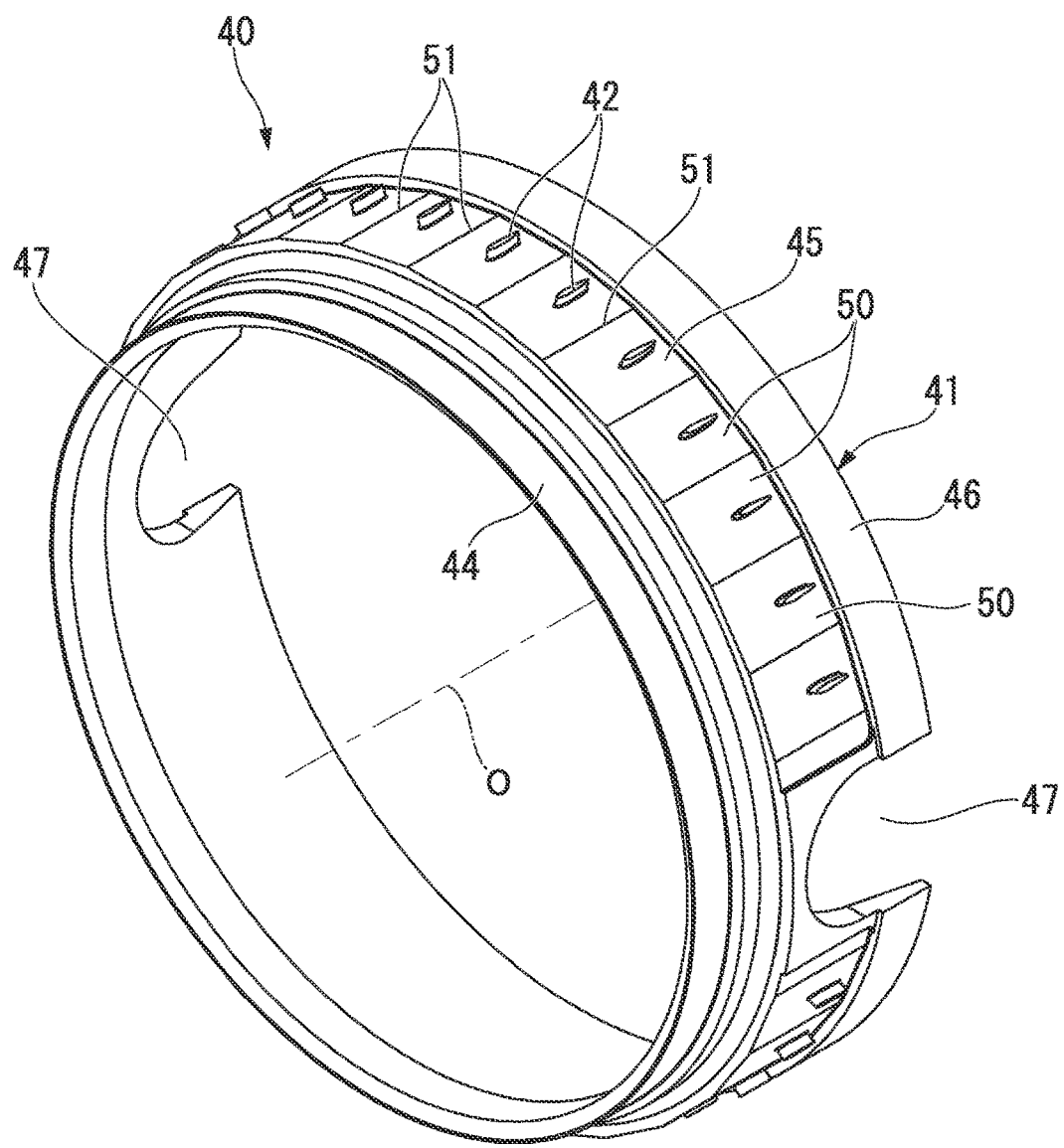
FIG. 4 is a perspective view of an outlet outer ring in the embodiment of the present invention.
Figure 5:
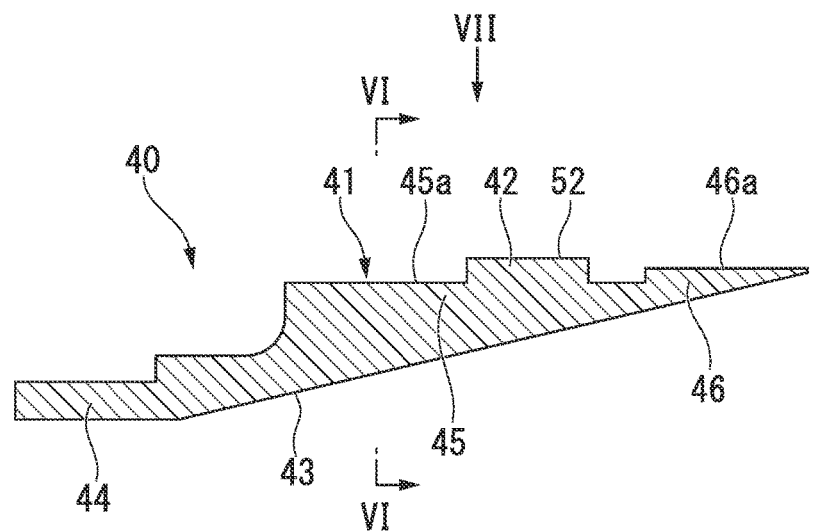
FIG. 5 is a cross-sectional view of the outlet outer ring in the embodiment of the present invention when viewed in a circumferential direction.

As illustrated in FIGS. 4 and 5, the main body 41 of the outlet outer ring 40 has a fitting part 44 fitted into the distal end 22 of the combustor basket main body 39, a polygonal ring part 45, and a restrictor part 46 in this order from the upstream side. At least one cutout portion 47 (two cutout portions in the present embodiment) is formed in the outlet outer ring 40.

The cutout portions 47 are provided at a side of the restrictor part 46 in the axial direction. The cutout portions 47 serve as paths of the flames propagated via coupling pipes. In the following description, a shape of the main body 41 will be described on the assumption that there are no cutout portions 47. The outlet outer ring 40 is formed with the cutout portions 47 having different shapes corresponding to a position or shape of the combustor 3 to be mounted. In addition, the cutout portions 47 are also used as parts connected to ignition plugs or for flame detection in addition to being used to propagate the flames.

The fitting part 44 is shaped to be fitted with the inner circumferential surface 20a of the distal end 22 of the combustor basket main body 39 without a gap. That is, the fitting part 44 of the outlet outer ring 40 has a smaller outer diameter than an inner diameter of the distal end 22 of the combustor basket main body 39.

An outer circumferential surface 46a of the restrictor part 46 is formed in a cylindrical shape. A gap S2 is provided between the outer circumferential surface 46a of the restrictor part 46 and the inner circumferential surface 30a of the transition piece 30 (see FIG. 3). In other words, an outer diameter of the restrictor part 46 is set such that the gap S2 is formed between the outer circumferential surface 46a of the restrictor part 46 and the inner circumferential surface 30a of the transition piece 30 when the outlet outer ring 40 is attached to the distal end 22 of the combustor basket main body 39.

Figure 6:
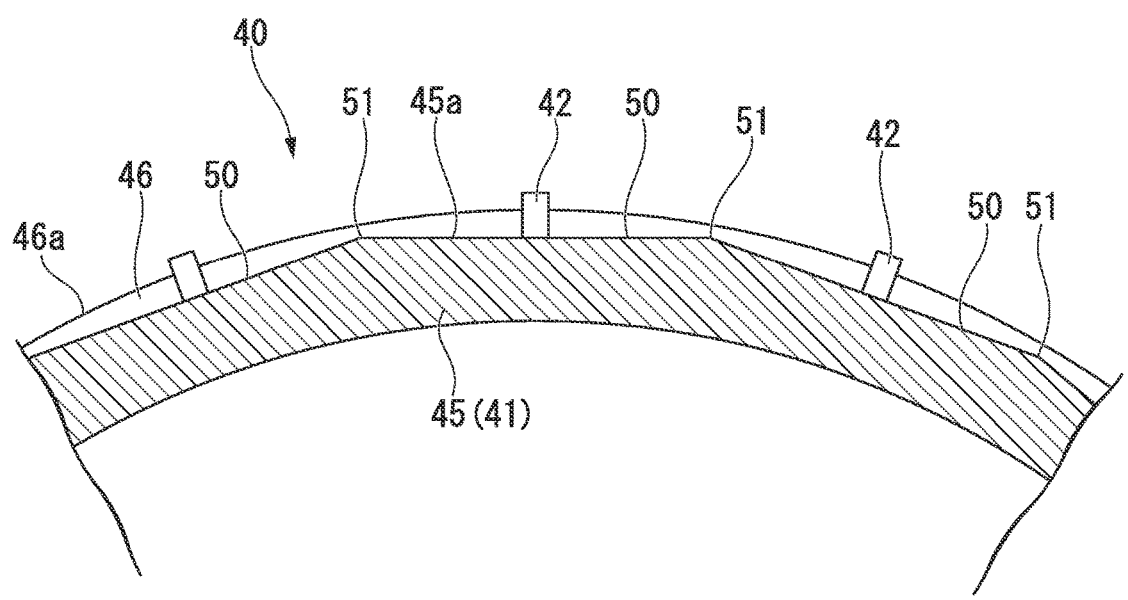
FIG. 6 is a cross-sectional view taken along line VI-VI of FIG. 5.

As illustrated in FIG. 6, the polygonal ring part 45 has a polygonal cross-sectional shape when viewed in the axial direction. That is, an outer circumferential surface 45a of the polygonal ring part 45 is not formed in an arc shape but has a plurality of outer circumferential planes 50 and a plurality of ridgelines 51 formed between one outer circumferential plane 50 and another outer circumferential plane 50.

The outer circumferential surface 45a of the polygonal ring part 45 of the present embodiment is formed in a 32-gonal cross-sectional shape having 32 planes and 32 ridgelines when viewed in the axial direction. The shape of the outer circumferential surface 45a of the polygonal ring part 45 is not limited to the present embodiment but various polygonal shapes may be employed. The polygonal shape to be used may be adequately set depending on, for instance, a diameter of the combustor basket 20. For example, in the case of a combustor basket having a smaller diameter than the combustor basket 20 of the present embodiment, the shape may be set to a polygonal shape having fewer planes or ridgelines than that of the present embodiment, for instance, a 20-gonal shape.

The outer circumferential planes 50 are formed at a radially inner side relative to the outer circumferential surface 46a of the restrictor part 46. In other words, a distance of each outer circumferential plane 50 from the central axis O is adapted to be shorter than a radius of the outer circumferential surface 46a of the restrictor part 46. Thereby, as illustrated in FIG. 3, a gap S3 between the outer circumferential plane 50 and the inner circumferential surface 30a of the transition piece 30 is adapted to be greater than the gap S2.

As illustrated in FIG. 5, the protrusions 42 have projected end faces 52 approximately parallel to the outer circumferential surface 45a. The projected end faces 52 are formed at a radially outer side relative to the outer circumferential surface 46a of the restrictor part 46. As illustrated in FIG. 3, the projected end faces 52 are formed such that heights thereof from the outer circumferential planes 50 are approximately equal to that of the gap S3.

Figure 7:
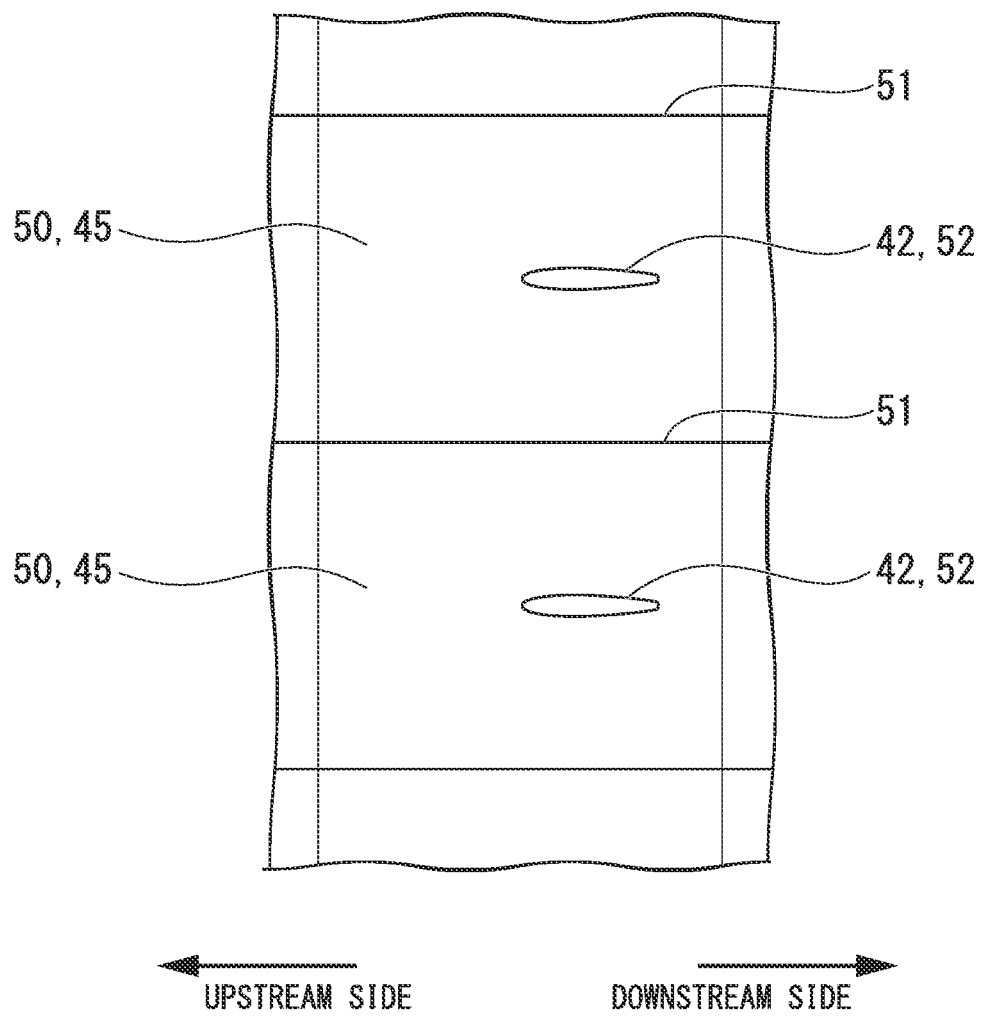
FIG. 7 is a view taken in the direction of arrow VII of FIG. 5.

As illustrated in FIG. 7, the protrusions 42 are formed in approximately the centers of the outer circumferential planes 50 in the circumferential direction so as to extend in the axial direction. A cross-sectional shape of each protrusion 42 when viewed in the radial direction is a spindle shape extending in the axial direction. In other words, in the protrusions 42, a cross section perpendicular to the radial direction has an elliptical shape that extends in a direction in which the compressed air A flows, and has a shape that disturbs the flow of the compressed air A flowing in from the upstream side as little as possible.

As illustrated in FIG. 3, a plurality of (e.g., eight) air supply holes 32 are formed adjacent to the proximal end 31 of the transition piece 30 in the circumferential direction. Axial positions of the air supply holes 32 are downstream from the seal plate 24 and upstream from the protrusions 42 when the transition piece 30 and the combustor basket 20 are combined. That is, the air supply holes 32 are formed at such positions that the compressed air A flowing in from the outer circumferential side of the transition piece 30 flows in at a position which is downstream from the seal plate 24 at the gap S1 between the transition piece 30 and the combustor basket 20 and which is upstream from the protrusions 42.

Next, a method of manufacturing the outlet outer ring 40 of the present embodiment will be described.

The outlet outer ring 40 of the present embodiment is manufactured by making an outline thereof using a machine tool such as a lathe, and then machining details using a machine tool such as a milling machine. Particularly, the polygonal ring part 45 of the outlet outer ring 40 is machined by an end mill of the milling machine because the protrusions 42 protruding in the radial direction are integrally formed in the polygonal ring part 45.

Figure 8:
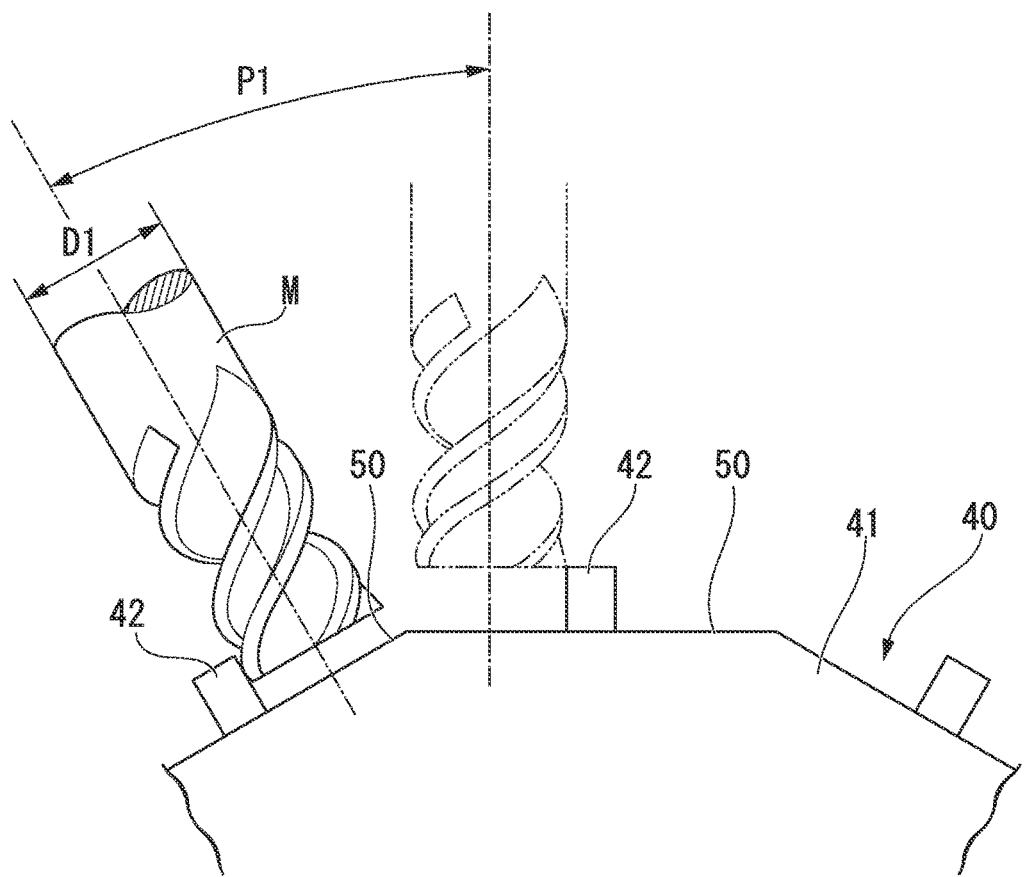
FIG. 8 is a cross-sectional view that is for describing a method of manufacturing the outlet outer ring in the embodiment of the present invention and corresponds to FIG. 6.

To be specific, as illustrated in FIG. 8, the outer circumferential planes 50 are machined using an end mill M such that the protrusions 42 remain. In the present embodiment, since the number of outer circumferential planes 50 is 32, a relative angle between the end mill M and the workpiece is changed 32 times including first installation in order to machine the outer circumferential planes 50. That is, the outer circumferential planes 50 on which the protrusions 42 are formed are machined by performing an angle change of a pitch P1 32 times.

Next, an operation of the gas turbine GT of the present embodiment will be described. In the gas turbine GT, the compressed air A compressed by the compressor 1 passes through a channel 14 (see FIG. 2) surrounded by the outer circumferential surface 30b of the transition piece 30, the outer circumferential surface 20b of the combustor basket 20, and an inner circumferential surface of the turbine casing 6, is reversed at a reverse portion 15, and flows into the combustor basket 20.

Next, the fuel supplied from the pilot burner 11 and the plurality of nozzles 12 of the fuel supplier 10 and the compressed air A are supplied from the combustor basket 20 to the transition piece 30. The fuel and the compressed air A supplied from the combustor basket 20 form flames in the transition piece 30. To be specific, diffusion flames are formed by the pilot fuel supplied from the pilot burner 11 and the compressed air A. Subsequently, a premixed gas produced by the plurality of nozzles 12 premixing the main fuel and the compressed air A is ignited by the diffusion flames. Thereby, premixed flames are formed.

The combustion gas G produced by combustion of the pilot fuel and the main fuel is delivered from the transition piece 30 into a turbine-side gas channel (not shown). The combustion gas G flowing into the turbine-side gas channel rotatably drives the turbine rotor 8 as described above.

As illustrated in FIG. 3, the compressed air A is taken into the space between the transition piece 30 and the combustor basket 20 via the air supply holes 32. Thus, the introduced compressed air A is ejected from the gap S2 between the transition piece 30 and the restrictor part 46 of the outlet outer ring 40 along the inner circumferential surface 30a of the transition piece 30.

The compressed air A ejected to the transition piece 30 forms a thin film on the inner circumferential surface 30a of the transition piece 30. That is, the film of the compressed air A film-cools the inner circumferential surface 30a of the transition piece 30, and protects the inner circumferential surface 30a of the transition piece 30 from the fuel and the compressed air A supplied from the opening 25 of the combustor basket 20 and the heat of the combustion gas G produced by the fuel and the compressed air A.

The compressed air A introduced into the transition piece 30 from the gap S1 may be used as air for combustion.

According to the above embodiment, the compressed air A ejected from the gap S2 film-cools the transition piece 30, and thereby burning of the transition piece 30 can be suppressed.

The protrusions 42 are formed on the outlet outer ring 40. Thereby, the gap S3 through which the compressed air A for film-cooling the transition piece 30 is supplied can be stably secured.

In addition, the protrusions 42 are integrally formed on the outlet outer ring 40. Thereby, the number of components for constituting the combustor basket 20 of the combustor 3 can be reduced.

The cross-sectional shape of each protrusion 42 when viewed in the radial direction is the spindle shape along the axial direction. Thereby, disturbance of the compressed air A at the positions at which the protrusions 42 are disposed is effectively suppressed. Thereby, uniformity of the compressed air A ejected from the gap S2 can be improved.

In addition, the polygonal ring part 45 of the outlet outer ring 40 is formed in the polygonal shape. Thereby, when the outer circumferential planes 50 of the polygonal ring part 45 are formed, the number of times the relative angle between the working tool and the workpiece is changed is reduced. Thereby, working man-hours can be reduced.

Figure 9:
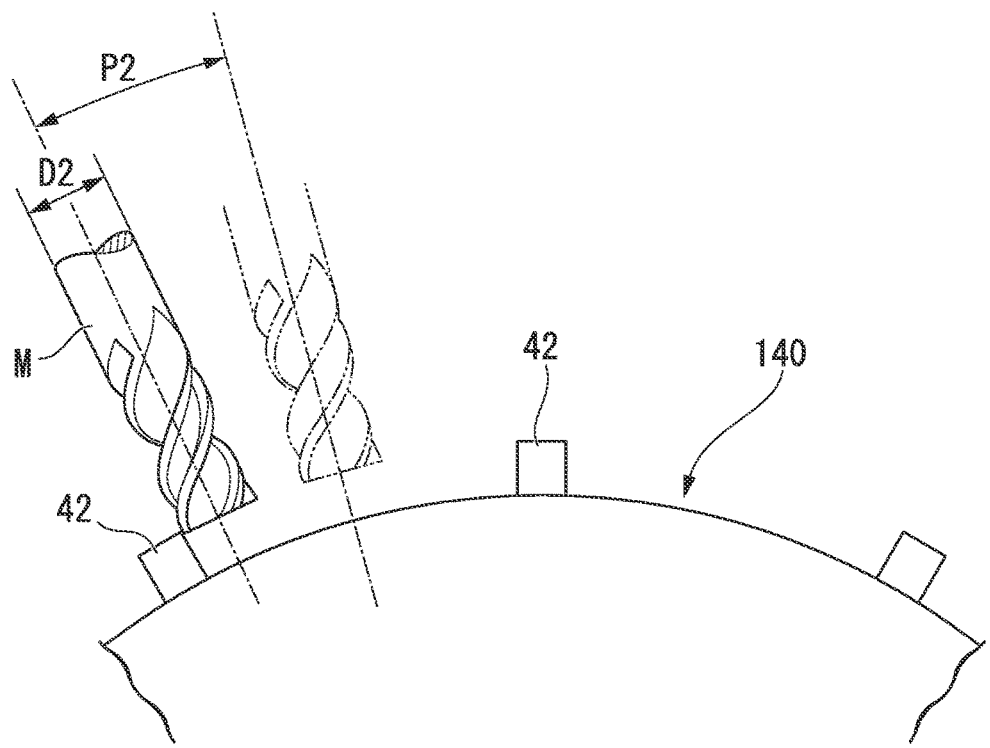
FIG. 9 is a cross-sectional view for describing a method of manufacturing an outlet outer ring in a comparative example.

FIG. 9 is a cross-sectional view for describing a method of manufacturing an outlet outer ring 140 of a comparative example. As illustrated in FIG. 9, in the outlet outer ring 140 of the comparative example, a part corresponding to the polygonal ring part 45 of the present embodiment is formed in a cylindrical shape when viewed in the axial direction. In the case of the outlet outer ring 140 of the comparative example, a machining pitch P2 of the end mill M needs to be smaller than the pitch P1 illustrated in FIG. 8 in order to machine the part corresponding to the polygonal ring part 45. When the angle change is required, for instance, 360 times in order to approximate this part to the cylindrical shape, the pitch P2 becomes about 1 degree.

The polygonal ring part 45 of the outlet outer ring 40 of the present embodiment is formed in the polygonal shape. For example, the polygonal ring part 45 of the present embodiment has the 32-gonal shape, and thus, as illustrated in FIG. 8, the pitch P1 becomes about 11 degrees.

The polygonal ring part 45 has the polygonal shape. Thereby, the end mill M can be made larger in diameter. That is, when the machining pitch is small, the end mill M having a size corresponding to such a pitch is required. However, as the machining pitch is increased and a plane to be machined is increased, an increase in the diameter of the end mill M is allowed. That is, the diameter D1 of the end mill M that machines the outlet outer ring 40 of the present embodiment can be greater than the diameter D2 of the end mill M that machines the outlet outer ring 140 of the comparative example.

The outer circumferential surface 46a of the restrictor part 46 is formed in the cylindrical shape, and the gap S2 between the outer circumferential surface 46a of the restrictor part 46 and the inner circumferential surface 30a of the transition piece 30 is uniform. Thus, the compressed air A ejected from the gap S2 can be made uniform in the circumferential direction.

In addition, the protrusions 42 are formed in the centers of the outer circumferential planes 50 of the polygonal ring part 45 in the circumferential direction. Thereby, the protrusions 42 are formed using the end mill M for forming the outer circumferential planes 50. As a result, it is possible to form the high-precision protrusions 42 in which a radial thickness is uniform and a circumferential surface is wide in the radial direction.

The technical scope of the present invention is not limited to the above-described embodiments, and modifications can be made in various ways without departing from the spirit and scope of the present invention. Further, the present invention may have a constitution in which the features described in the plurality of embodiments are arbitrarily combined.

Figure 10:
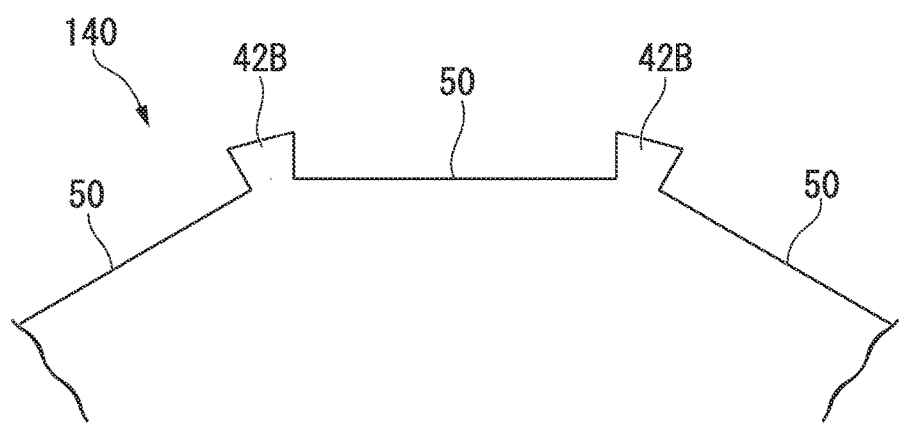
FIG. 10 is a cross-sectional view that illustrates the outlet outer ring of a modified example and corresponds to FIG. 6.

For example, as long as the protrusions 42 of the outlet outer ring 40 are integrally formed with the main body 41, the protrusions 42 need not be formed in the centers of the outer circumferential planes 50 in the circumferential direction. As illustrated in FIG. 10, protrusions 42B may each be formed on a ridgeline between one outer circumferential plane 50 and another outer circumferential plane 50.

The introduction of the compressed air A used for the film-cooling is not limited to the method of introduction through the air supply holes 32. Another introducing method may be used. For example, the compressed air A may be introduced from the slits formed in the seal plate 24.

The shapes of the protrusions 42 are not limited to the spindle shape when viewed in the radial direction. A shape that has no influence on the flow of the compressed air A may be appropriately employed. For example, the shape may be a circular shape when viewed in the radial direction.

In addition, the number of protrusions 42 is not limited to one in each outer circumferential plane 50. A plurality of protrusions 42 may be formed in each outer circumferential plane 50.

INDUSTRIAL APPLICABILITY

According to this combustor, the main body and the protrusions are integrally formed at the ring part. Thereby, the number of components can be reduced, and the manufacturing costs of the combustor can be reduced. Also, when the outer circumferential surface of the main body being a workpiece is formed, the number of times the relative angle between the working tool and the workpiece is changed is reduced, and thus the machining man-hours can be reduced.

REFERENCE SIGNS LIST

1 compressor
2 air intake
3 combustor
5 turbine
6 turbine casing
7 casing
8 turbine rotor
10 fuel supplier
11 pilot burner
12 nozzle
20 combustor basket (first tube)
20*a* inner circumferential surface
20*b* outer circumferential surface
21 proximal end
22 distal end
23 leaf spring
24 seal plate
25 opening
30 transition piece (second tube)
30*a* inner circumferential surface
30*b* outer circumferential surface
31 proximal end
32 air supply hole
35 opening
39 combustor basket main body (first tube main body)
40 outlet outer ring (ring part)
41 main body
42 protrusion
43 extension surface
44 fitting part
45 polygonal ring part
45*a* outer circumferential surface
46 restrictor part
46*a* outer circumferential surface
47 cutout portion
47 outer circumferential plane
50 ridgeline
51 projected end face
A compressed air
G combustion gas
GT gas turbine
S1 gap
S2 gap
S3 gap

The invention claimed is:

1. A combustor comprising:
    a first tube which supplies fuel and air from an opening formed in a distal end thereof; and
    a second tube which is configured such that the distal end of the first tube is inserted into an inner circumferential side of a proximal end thereof,
    wherein:
    the first tube includes a first tube main body and a ring part forming the distal end of the first tube,
    the ring part has a main body of a tubular shape and protrusions that are integrally formed with the main body on an outer circumferential surface of the main body and protrude radially outward,
    when viewed in an axial direction along an axis of the first tube, the outer circumferential surface of the main body has a polygonal cross-sectional shape within a range within which the protrusions are formed, and
    the main body includes a polygonal ring part on which the protrusions are formed, and a restrictor part at a distal end side relative to the polygonal ring part and an outer circumferential surface of which is formed in a cylindrical shape at a radially outer circumferential side relative to an outer circumferential surface of the polygonal ring part.

2. The combustor according to claim 1, wherein the protrusions are formed in centers of outer circumferential planes of the polygonal ring part in a circumferential direction.

3. The combustor according to claim 2, wherein, when viewed in a radial direction along a radius of the first tube, each of the protrusions has a spindle cross-sectional shape along the axial direction.

4. A gas turbine comprising:
    the combustor according to claim 2; and
    a turbine driven by a combustion gas delivered from the second tube of the combustor.

5. The combustor according to claim 1, wherein, when viewed in a radial direction along a radius of the first tube, each of the protrusions has a spindle cross-sectional shape along the axial direction.

6. A gas turbine comprising:
    the combustor according to claim 1; and
    a turbine driven by a combustion gas delivered from the second tube of the combustor.

* * * * *